(12) United States Patent
Elias et al.

(10) Patent No.: US 10,675,981 B2
(45) Date of Patent: Jun. 9, 2020

(54) CHARGING DEVICE FOR INDUCTIVELY CHARGING AN ELECTRICAL ENERGY STORE OF A MOTOR VEHICLE AND METHOD FOR OPERATING A CHARGING DEVICE

(71) Applicant: AUDI AG, Ingolstadt (DE)

(72) Inventors: Björn Elias, Hepberg (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 44 days.

(21) Appl. No.: 15/574,606

(22) PCT Filed: May 12, 2016

(86) PCT No.: PCT/EP2016/060765
§ 371 (c)(1),
(2) Date: Nov. 16, 2017

(87) PCT Pub. No.: WO2016/184785
PCT Pub. Date: Nov. 24, 2016

(65) Prior Publication Data
US 2018/0134164 A1     May 17, 2018

(30) Foreign Application Priority Data
May 16, 2015   (DE) ........................ 10 2015 006 313

(51) Int. Cl.
*H02J 7/02*      (2016.01)
*B60L 11/18*     (2006.01)
(Continued)

(52) U.S. Cl.
CPC ............ *B60L 11/182* (2013.01); *B60L 53/12* (2019.02); *B60L 53/38* (2019.02); *H02J 7/025* (2013.01);
(Continued)

(58) Field of Classification Search
USPC ........................................ 320/108, 104, 109
See application file for complete search history.

(56) References Cited

U.S. PATENT DOCUMENTS 5,248,215 A     9/1993   Fladung
5,821,731 A *   10/1998   Kuki ....................... B60L 53/12
                                                                 320/108
(Continued)

FOREIGN PATENT DOCUMENTS

CN          102806839 A     12/2012
CN          103089550 A      5/2013
(Continued)

OTHER PUBLICATIONS

Examination Report dated of corresponding German application No. 10 2015 006 313.8; 6 pgs.
(Continued)

*Primary Examiner* — Richard Isla
*Assistant Examiner* — Mohammed J Sharief
(74) *Attorney, Agent, or Firm* — Maier & Maier, PLLC

(57) ABSTRACT

A charging device for inductively charging an electrical energy store of a motor vehicle that is provided with a primary coil which is designed to induce a voltage in a secondary coil of the motor vehicle in order to charge the electrical energy store, and with a lifting mechanism, which is designed to move the primary coil between a stored position and a charging position. The charging device is provided with at least one heating conductor, in particular a heating wire, which is arranged on the lifting mechanism and which can be controlled by a control device of the charging device. The invention further relates to a method for operating a charging device.

5 Claims, 1 Drawing Sheet

(51) Int. Cl.
*B60L 53/12* (2019.01)
*B60L 53/38* (2019.01)
*H01F 38/14* (2006.01)

(52) U.S. Cl.
CPC .......... *H01F 38/14* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 6,619,342 | B2 | 9/2003 | Graham et al. |
| 6,676,122 | B1 | 1/2004 | Wobben |
| 6,710,302 | B1* | 3/2004 | Rennick .................. G01S 15/04 219/202 |
| 7,783,400 | B1* | 8/2010 | Zimler .................. B60S 1/0866 219/202 |
| 8,292,579 | B2 | 10/2012 | Magnuson |
| 9,252,621 | B2 | 2/2016 | Miyano |
| 2004/0239289 | A1* | 12/2004 | Pfab ...................... H02J 7/1438 320/104 |
| 2009/0011616 | A1 | 1/2009 | Patwardhan |
| 2010/0308768 | A1 | 12/2010 | Dower |
| 2011/0199047 | A1 | 8/2011 | Fujii |
| 2014/0002016 | A1* | 1/2014 | Bachmaier ............ B60L 11/182 320/108 |
| 2014/0152057 | A1* | 6/2014 | Truant .................. B60N 2/879 297/180.12 |
| 2016/0280084 | A1* | 9/2016 | McGrath .................. B60L 5/42 |

FOREIGN PATENT DOCUMENTS

| | | |
|---|---|---|
| DE | 24 34 890 B1 | 11/1975 |
| DE | 3801342 A1 | 7/1989 |
| DE | 42 36 286 A1 | 5/1994 |
| DE | 69711963 T2 | 11/2002 |
| DE | 10 2011 118 397 A1 | 5/2012 |
| DE | 10 2011 076 186 A1 | 11/2012 |
| DE | 10 2012 208 005 A1 | 11/2013 |
| DE | 10 2013 100 019 A1 | 7/2014 |
| EP | 1 061 631 A1 | 12/2000 |
| FR | 2785307 A1 | 5/2000 |
| GB | 2 293 522 B | 1/1999 |
| GB | 2 471 879 A | 1/2011 |
| JP | 2010-268664 A | 11/2010 |
| KR | 10-1035454 B1 | 5/2011 |
| WO | 2010/098412 A1 | 9/2010 |
| WO | 2011/079215 A2 | 6/2011 |
| WO | 2013/081542 A1 | 6/2013 |
| WO | 2013/176410 A1 | 11/2013 |
| WO | 2015/036154 A1 | 3/2015 |

OTHER PUBLICATIONS

International Search Report dated of corresponding International application No. PCT/EP2016/060765; 18 pgs.
English translation of the International Preliminary Report on Patentability, dated Nov. 30, 2017, of corresponding International application No. PCT/EP2016/060765; 7 pgs.
Office Action dated Sep. 3, 2019, in corresponding Chinese Application No. 201680028094.0; 16 pages.
Office Action dated Apr. 3, 2020 in corresponding Chinese Application No. 201680028094.0; 12 pages including English-language translation.

* cited by examiner

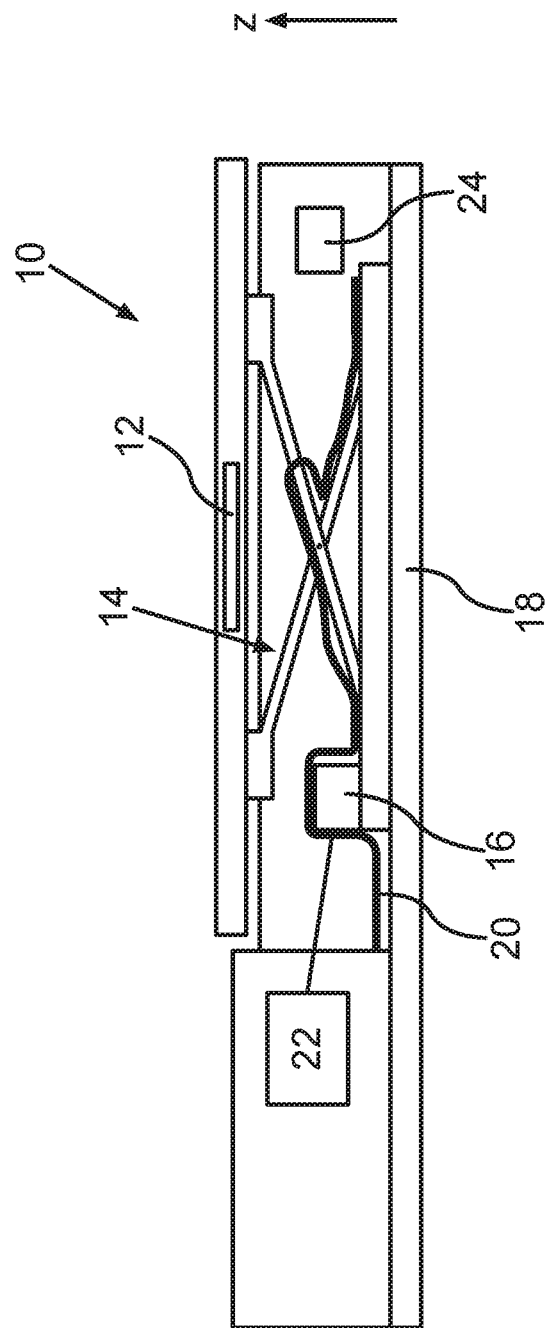

CHARGING DEVICE FOR INDUCTIVELY CHARGING AN ELECTRICAL ENERGY STORE OF A MOTOR VEHICLE AND METHOD FOR OPERATING A CHARGING DEVICE

FIELD

The invention relates to a charging device for inductively charging an electrical energy store of a motor vehicle. In addition, the invention relates to a method for operating such a charging device.

BACKGROUND

U.S. Pat. No. 6,619,342 B2 describes a service terminal with a vertically movable and heatable connecting station.

EP 1 061 631 A 1 describes a connection device and a connection method for an electric vehicle. The connection device comprises a lifting mechanism for positioning a primary coil of the connecting device.

DE 4 236 286 A1 describes a method and an arrangement for automatic and contactless charging of a battery of a motor vehicle. The arrangement comprises a sensor-controlled lifting element which can be moved by means of which a primary coil for inductive power transmission.

DE 2 434 890 B1 describes a method for connecting a charger device arranged in a motor vehicle with an alternating or three-phase network transformer part. In the area of a dome surface can be provided heating coils to keep the dome surface free of ice.

DE 10 2011 076 186 A1 describes a charging device for inductive charging of a motor vehicle with a primary coil, which is designed to induce a voltage in a secondary coil of the motor vehicle in order to charge an electric energy store. The charging device includes in addition also a lifting mechanism which is designed to move the primary coil between a stored position and a charging position. The primary coil is in this case arranged in a ground induction plate which can be moved by means of the lifting mechanism. The charging device comprises a fan, which can supply heated air by means of a heating element to the upper side of the ground induction plate, which is to say to supply it to the side facing the motor vehicle to be charged, in order to heat the upper side of the ground induction plate.

These kinds of charging devices that are provided with a lifting mechanism can experience problems with the lifting mechanism when the temperatures are at or below the freezing point, and in particular in humid weather. In particular when the movable parts of the lifting mechanism freeze, such as for example joints, bellows or the like, operations free of interference are limited or even prevented. As a result, the efficiency during inductive charging of an energy storage device of a motor vehicle can be considerably restricted, or it may not be possible to carry out the charging operation as such under some circumstances, because when the lifting mechanism is frozen, so that the primary coil can no longer be moved into the charging position in which the gap between the primary coil and the second coil should be as small as possible.

SUMMARY

The objective of the present invention is to provide a charging device and a method for operating a charging device by means of which reliable inductive charging of an electrical energy store of a motor vehicle can be ensured even in the conditions of winter weather.

This objective is achieved with a charging device and with a method for operating a charging device.

The charging device for inductive charging of an electrical energy store of a motor vehicle comprises a primary coil, which is designed to induce a voltage in a secondary coil of the motor vehicle for charging the electrical energy store.

The charging device according to the invention includes in addition a lifting mechanism, which is designed to move the primary coil between a stored position and a charging position. In order to ensure a reliable function, which is in particular independent of weather conditions, it is provided according to the invention that the charging device is provided with at least one heating conductor, in particular a heating wire, which is arranged on the lifting mechanism and which can be controlled by means of a control device of the charging device. It is thus possible to prevent by means of the heating conductor icing on the lifting mechanism, or to melt ice on the freezing mechanism. In particular movable parts and parts of the lifting mechanism that are movable relative to one another can be reliably maintained free of ice in this manner even under unfavorable weather conditions, which is to say even when the temperatures are at or below the freezing point and with a relatively high air humidity and/or a relatively high moisture in the area of the lifting mechanism. The charging device can thus be used reliably also under wintery weather conditions because the lifting mechanism can be maintained free of ice and it is thus capable of functioning at least by means of a heating conductor which can be controlled with a control device.

According to an advantageous embodiment of the invention it is provided that at least one heating conductor is arranged on at least one movable component of the lifting mechanism. For example, the heating conductor can be arranged in the area of the joints or of the movable struts of the lifting mechanism. It is preferred when the heating conductor is formed as a heating wire, which can be arranged so that it is wound around the movable components, or components of the lifting mechanism that are movable relative to each other. As an alternative, it is also possible that the heating conductor or several heating conductors are arranged on the side of the inner circumference with a lifting mechanism that is provided at least partially with a hollow design. In this case, damage to the heating conductor or heating conductors can be reliably prevented. Therefore, the heating conductor or a plurality of heating conductors, which is or are arranged on one or on a plurality of the movable components of the lifting mechanisms, can in particular keep these components free of ice or unfreeze them. A reliable functioning of the lifting mechanism in the conditions of wintery temperatures and under humid conditions can thus be ensured.

The at least one heating conductor can be in this case activate and deactivated as needed, so that the lifting mechanism remains free of ice and therefore retains its functionality.

According to another embodiment of the invention it is provided that the control device is designed to operate the heating conductor as a function of the weather data, in particular with respect to weather data that is provided with respect to ambient temperatures and/or ambient humidity. It is preferred when the charging device comprises a sensor device for detecting the temperature and the humidity, wherein the control device receives data relating to the temperature and humidity from a sensor device and operates at least one heating conductor depending on this data. As an alternative or in addition, it can be also provided that the charging device is equipped with a communication device by means of which data relating to the temperature or to the humidity can be received, so that this data is then again supplied to the control device which operates the at least one heating conductor as a function of this data. In addition to measuring or detecting the ambient air humidity, the humidity of the lifting mechanism can be also detected, so that at temperatures around or below the freezing point, it can be estimated in an even more reliable manner whether freezing is a risk for the lifting mechanism. In particular when both the sensor device and said communication device are provided, supplying also redundant data with respect to the temperature and humidity enables a particularly reliable operation of the charging device as corresponding weather data can be made available at any time as a function of an activation of the at least one heating conductor. Icing of the lifting mechanism and in particular of movable parts or parts of the lifting mechanism that are movable relative to each other can be prevented.

In another advantageous embodiment of the invention it is provided that the control device is designed to activate the heating conductor for a predetermined duration before an impending charging process. For example, vehicle-specific information about a communication system can be exchanged with the charging device. The control device can receive a corresponding signal if a motor vehicle is in the vicinity of the charging device, or if it is approaching the charging device.

In this case it is likely that a charging operation of the relevant motor vehicle, or more specifically of the energy store of the relevant motor vehicle, is about to take place by means of the charging device. Even before the charging operation begins, at least one heating conductor is controlled by means of the control device in such a way that the lifting mechanism, which may have been up to this point frozen or partially frozen, is deiced. This can be used to ensure that an imminent charging operation can be carried out in any case without problems.

According to another preferred embodiment of the invention it is provided that the control device is designed to activate the heating conductor if in order to adjust the lifting mechanism, a force is applied that is greater than a predetermined force value. For example, it may be provided that the control device is connected to an electric engine by means of which the lifting mechanism can be adjusted. The control device can thus sample information or data in this manner, which characterize the force that was applied or that is currently required during the adjustment of the lifting mechanism. The predetermined force value is in this case greater than a force that is usually needed to adjust a lifting mechanism that is not frozen. However, if it is necessary to apply a force during the adjustment of the lifting mechanism that is greater than a predetermined force, this could be an indication that the lifting mechanism is at least partially frozen and that is why it operates less smoothly than usual. It is therefore detected, at the latest during the adjustment of the lifting mechanism, that the lifting mechanism is frozen. In this case, the control device is designed to activate at least on heating conductor so that the lifting mechanism is deiced as quickly as possible and a reliable charging operation can be carried out by means of the charging device.

According to another embodiment of the invention it is provided that the control device is designed to activate the heating conductor if a charging current value falls during the charging of an energy store of a motor vehicle below a predetermined charging current value. One specific reason for this could be for example that it was not possible to fully move the lifting mechanism from the stored position to the final position for charging, for example because the lifting mechanism was frozen. For such a case, the control device is designed to activate at least one heating conductor so that the potentially frozen lifting mechanism can be deiced as quickly as possible. The lifting mechanism can thus be moved relatively speedily to the desired or predetermined charging position and a particularly efficient charging operation can be ensured.

According to another advantageous embodiment of the invention it is provided that control device is designed to activate and to deactivate the heating conductor in predetermined cyclical intervals. This makes it possible to ensure that the lifting mechanism will be kept free of ice without a major measurement and control expense. The modes of operation mentioned above for operating the control units in order to operate the heating conductor can be also mutually combined with each other.

According to the method for operating a charging device of this invention or according to a preferred embodiment for operating a charging device according to the invention, at least one heating conductor is controlled by means of a control device for heating the lifting mechanism. Preferred embodiments of the charging device according to the invention can be also regarded as advantageous embodiments of the method according to the invention, wherein the charging device is in particular equipped with means for carrying out the steps of the method according to the invention.

Further advantages, features and details of the invention will become apparent from the description of preferred embodiments below and from the figures. The features and feature combinations mentioned above in the description, as well as the features and combinations of features shown below can be used not only in the listed combinations, but also in other combinations, or separately, without deviating from the scope of the present invention.

BRIEF DESCRIPTION OF THE FIGURE

FIG. 1 shows a charging device for inductively charging an electrical energy store of a motor vehicle in a sectional, schematic lateral view, wherein the charging device is provided with a lifting mechanism that is designed to move a primary coil of the charging device between a stored position and a charging position.

DETAILED DESCRIPTION OF THE FIGURE

FIG. 1 shows a charging device 10 for inductively charging an electrical energy store, not shown here, of a motor vehicle, comprises a primary coil 12, which is designed to induce a voltage in a secondary coil, not shown, of a motor vehicle for charging the relevant electrical energy store. In order to achieve a high efficiency during the charging operation, it is important to keep the distance between the primary coil 12 and the secondary coil as short as possible. For that reason, the charging device 10 is also provided with another lifting mechanism 14 which is designed to move the primary coil 12 in the direction z of the height of the charging device, which is to say in the vertical direction, between the stored position shown here and the extended charging position. It is also possible to move the primary coil 12 by means of the lifting mechanism 14 closer to a secondary coil of the respective motor vehicle whose electrical energy store is to be inductively charged.

The lifting mechanism 14 can be designed for example as suggested here in the form of a type of a scissor lift stage. However, other configurations or effective principles of the lifting mechanism 14 are also possible. The charging device 10 comprises a drive 16, by means of which the lifting mechanism 14 can be moved between the stored position shown here and the charging position in the vertical direction z. The lifting mechanism 14 comprises some movable parts, such as for example joints, bellows and the like. In particular under the weather conditions in winter, which is to say at temperatures at or below the freezing point and with a relatively high humidity, there is the risk that inter alia, the movable components of the lifting mechanism 14 capable of relative movement towards each other will freeze and a reliable functionality of the charging device will be compromised.

The charging device also comprises an aluminum plate 22 which serves as a ground plate of the charging device. The aluminum plate 22 is provided with positive characteristics with respect to the magnetic field generated during the charging of the charging device 10 and it is preferably constructed as a part of the housing of the charging device 10.

In order to ensure a reliable functionality of the lifting mechanism 14 also under the weather conditions in winter, which is to say to prevent freezing of the lifting mechanism 14 or to enable the deicing of the lifting mechanism 14, the charging device 10 is provided with at least one heating conductor 20, which is arranged on the lifting mechanism 14 and which can be controlled by means of the control device 22 of the charging device. The heating conductor 20 can be designed for example as a heating wire. In addition, several different heating conductors 20 that can be controlled by the control device 22 can be also provided. The heating conductor 20 is in this case preferably arranged on one of the plurality of the movable components of the lifting mechanism 14, such as for example joints, movable struts, bellows, or the like. The heating conductor 20 can be in this case also arranged on the outer circumference side, or on said components, or on the outer circumference side of said components. The latter option is advantageous if the relevant components are designed at least partially hollow, so that the heating conductor 20 can be arranged on the inner side and thus it can be particularly well protected from external influences. The freezing of the lifting mechanism 14 can thus be prevented by means of the heating conductor 20, or by means of a plurality of heating components 20, or the ice on the lifting mechanism 14 can be melted away by means of the heating conductor 20 or heating conductors 20 with the heat that is provided in this manner.

The charging device 10 comprises in addition also a sensor arrangement 24 for detecting the temperature and humidity. The sensor arrangement 24 can be in addition also designed so as to detect humidity directly on the lifting mechanism 14. As an alternative or in addition, the charging device 10 can be also provided with a communication device, not shown, by means of which for example online weather data can be received.

The control device 22 is designed to operate the at least one heating conductor 20 as a function of the weather data provided by the sensor device 24 and/or by said communication device. For example, it can be provided that when a limiting temperature of 2 degrees, 1 degrees or 0 degrees is predetermined, the heating conductor 20 is automatically activated by means of the control device 22 as long as the temperature in the area of the charging device 10 falls below this limiting temperature. Furthermore, it can be also provided that the control device 22 will activate the heating conductor 20 when the measured air humidity in the area of the charging device is above a predetermined threshold value and the temperature in the area of the charging device is below said limiting temperature.

In addition, the control device 22 can be designed to activate the heating conductor 20 for a predetermined period before an imminent charging operation. The charging device 10 can be in communication for example with another motor vehicle to be charged by means of a communication system, not shown. If for example a motor vehicle approaches the charging device 10 or moves to its immediate vicinity, the charging device 22 can activate the heating conductor 20 as a precaution, so that the charging device 10 and in particular the lifting mechanism 14 are functional and free of ice. The charging device 22 can be designed for example to activate the heating conductor 20 five minutes, or also ten minutes, or even a few seconds before an impending charging operation. This predetermined interval during which the heating conductor 20 is activated prior to an assumed impending charging process can be predetermined for example as a function of the heating power of the heating conductor 20 and/or according to the detected ambient weather conditions of the charging device 10.

Furthermore, the control device 22 can be also designed to activate the heating conductor 20 if a force is applied to adjust the lifting mechanism 14 which is greater than a predetermined force value. The predetermined force value is in this case preferably selected to be greater than a force that is usually required for adjusting the ice-free lifting mechanism 14. Therefore, if at the beginning of the activation of the lifting mechanism 14 for moving the primary coil 12 from the stored position into the charging position, a force is applied by the drive unit 16 which is greater than the predetermined force, this can be an indication that the lifting mechanism 14 is frozen. As a result, the control device 22 activates the heating conductor 20. If it is then detected based on the heating of the moving mechanism 14 that the force to be applied is again smaller than the predetermined force, the control device 22 may deactivate again the heating conductor 20, or at least operate it only for a short period of time, for example for one minute or the like.

In addition, the control device 22 can be designed to activate the heating conductor 20 if the current value of a charging current during the charging of an electrical energy store of a motor vehicle is below a predetermined charging current volume. This could be an indication that it was not possible to move the lifting mechanism 14 completely into the charging position, for example because some movable components of the lifting mechanism, or components that are movable relative to each other, are frozen. This is because if the gap between the primary coil 12 and the relevant secondary coil is too big, a smaller charging current will be obtained during the charging of the relevant electrical energy store of the motor vehicle. In such a case it can be provided that the heating conductor 20 is activated by the control device 22 in order to make it possible for the lifting mechanism 14 to be fully extended into the charging position.

Furthermore, it can be also provided that the control device 22 is designed to activate and deactivate the heating conductor 20 in cyclical intervals. This can be carried out for example as a function of the weather conditions, which is to say when temperatures in the minus range are detected and a higher air humidity is measured. The cyclical activation and deactivation of the heating conductor 20 it can thus be used to ensure that at all times, the moving mechanism 14 will not be frozen and that the charging device 10 can thus be continuously operated even at frosty temperatures.

The invention claimed is:

1. A charging device for inductively charging an electrical energy store of a motor vehicle, comprising:
   a primary coil to induce a voltage in a secondary coil of a motor vehicle for charging the electrical energy store;
   a lifting mechanism to move the primary coil between a stored position and a charging position, wherein the charging device is provided with at least one heating conductor, which is arranged on a lifting mechanism and which can be controlled by a control device of the charging device;
   wherein at least one heating conductor is arranged on at least one movable component of the lifting mechanism;
   wherein the at least one heating conductor is arranged and configured to heat the lifting mechanism of the charging device by heating the at least one movable component of the lifting mechanism;
   wherein the control device is designed to operate the heating conductor as a function of provided weather data, with respect to ambient temperatures and with respect to ambient humidity; and
   wherein the control device is designed to activate the heating conductor if a force is applied to adjust the lifting mechanism is greater than a predetermined force required to adjust the lifting mechanism from the stored position to the charging position, and/or if a charging current falls during the charging of an electrical energy store of the motor vehicle below a predetermined charging current value.

2. The charging device according to claim 1, further comprising:
   a sensor device for the provided weather data.

3. The charging device according to claim 1, further comprising:
   a communication device for receiving the weather data.

4. The charging device according to claim 1, wherein the control device is designed to activate the heating conductor for a predetermined time period before a charging operation.

5. The charging device according to claim 1, wherein the control device is designed to activate and deactivate the heating conductor in predetermined cyclical intervals.

* * * * *